UNITED STATES PATENT OFFICE.

SAMUEL ERNEST GROVES, OF FELLING-ON-TYNE, AND THEODORE WILLIAM HOLZAPFEL WARD, OF LONDON, ENGLAND.

DOPE OR VARNISH USED IN AEROPLANE CONSTRUCTION.

1,400,430. Specification of Letters Patent. Patented Dec. 13, 1921.

No Drawing. Application filed August 2, 1918. Serial No. 248,035.

*To all whom it may concern:*

Be it known that we, SAMUEL ERNEST GROVES and THEODORE WILLIAM HOLZAPFEL WARD, both subjects of the King of Great Britain, residing, respectively, in Felling-on-Tyne, England, and London, England, have jointly invented certain new and useful Improvements in Dopes or Varnishes Used in Aeroplane Construction, of which the following is a specification.

The dope or varnish commonly used in aeroplane construction is generally a solution of cellulose ester such as cellulose acetate, cellulose nitrate or celluloid. In order that the solution may not be too viscous for application, it is diluted with acetone which is, therefore, used in somewhat larger proportion, usually between 40 and 70 per cent. of the mixture.

By the present invention this proportion is considerably reduced, with corresponding economy, by adding to the mixture a small proportion of a hygroscopic chlorid which is found to have the effect of so reducing the viscosity of the cellulose ester solution that it does not require so much dilution with acetone as it does in the absence of such chlorids.

The varnish medium to which the invention chiefly relates is a solution of cellulose acetate, cellulose nitrate or celluloid, or other cellulose ester, with or without such gums and oils as are generally used in varnish manufacture.

It is preferable that the hygroscopic chlorid should be one that is soluble in an organic solvent. For example suitable chlorids are zinc chlorid, calcium chlorid, magnesium chlorid or chlorid of tin, or a mixture of two or more of such chlorids.

In the case of a nitrocellulose varnish, containing some 10 per cent. of celluloid, one of the chlorids named above, or a mixture of two or more of these chlorids, may be added in such proportion that the mixture contains about 1.0 per cent. of combined chlorin.

To illustrate the advantage of the use of a mixture of chlorids it may be stated that three varnishes were made from the same syrup with the addition of 1 per cent. of combined chlorin in the form of zinc chlorid in No. 1, calcium chlorid in No. 2 and a mixture in molecular proportions of calcium and zinc chlorids in No. 3. The viscosities at 25° C. as compared with that of glycerin at the same temperature, were glycerin=100, No. 1=104.9, No. 2=78.4, No. 3=56.5. This, means that the proportion of acetone in the varnish may be reduced to 20 per cent. as compared with the aforesaid 40 to 70 per cent.

The best material at present known to us for addition to a varnish for the purposes of this invention is a mixture in molecular proportions of calcium chlorid and zinc chlorid dissolved in alcohol, the solution having been neutralized by boiling it with zinc before use.

Having now particularly described and ascertained the nature of our said invention and in what manner the same is to be performed, we declare that what we claim is:—

1. A cellulose ester, dope or varnish containing acetone in proportion insufficient of itself to produce the necessary low viscosity, and a hygroscopic chlorid sufficient to produce the said low viscosity.

2. A cellulose ester, dope or varnish containing twenty per cent. of acetone and one per cent. of a hygroscopic chlorid.

In testimony whereof we have signed our names to this specification in the presence of the subscribing witness.

SAMUEL ERNEST GROVES.
THEODORE WILLIAM HOLZAPFEL WARD.

Witness:
C. S. HOPKINS.